(12) United States Patent
Demia et al.

(10) Patent No.: US 6,862,931 B2
(45) Date of Patent: Mar. 8, 2005

(54) VOLUMETRIC LIQUID METER

(75) Inventors: Laurent Demia, Macon (FR);
Christian Turplin, Macon (FR);
Jerome Manigand, Villeneuve (FR)

(73) Assignee: Actaris S.A.S., Montrouge (FR)

(*) Notice: Subject to any disclaimer, the term of this patent is extended or adjusted under 35 U.S.C. 154(b) by 18 days.

(21) Appl. No.: 10/239,975

(22) PCT Filed: Feb. 4, 2002

(86) PCT No.: PCT/FR02/00409
§ 371 (c)(1),
(2), (4) Date: Mar. 12, 2003

(87) PCT Pub. No.: WO02/063251
PCT Pub. Date: Aug. 15, 2002

(65) Prior Publication Data
US 2003/0154782 A1 Aug. 21, 2003

(30) Foreign Application Priority Data
Feb. 2, 2001 (FR) .......................... 01-01539

(51) Int. Cl.$^7$ .............................................. G01F 3/14
(52) U.S. Cl. ......................................................... 73/239
(58) Field of Search .......................... 73/238, 239, 241, 73/252, 253, 258, 268, 861.31, 861.32

(56) References Cited

U.S. PATENT DOCUMENTS

| | | |
|---|---|---|
| 3,523,455 A | 8/1970 | Branitzky |
| 5,220,830 A | 6/1993 | Bonne |
| 5,546,801 A * | 8/1996 | Swinson et al. .............. 73/273 |
| 5,576,489 A | 11/1996 | Munck et al. |

FOREIGN PATENT DOCUMENTS

| | | |
|---|---|---|
| DE | 198 15 654 A1 | 10/1999 |
| GB | 784759 | 10/1957 |

* cited by examiner

Primary Examiner—Edward Lefkowitz
Assistant Examiner—Corey D. Mack
(74) Attorney, Agent, or Firm—Straub & Pokotylo; Michael P. Straub

(57) ABSTRACT

A reciprocating-piston type meter for measuring liquid volume comprises a meter body 2 having a measuring chamber disposed therein. In a space 11 existing between the meter body 2 and the measuring chamber 7, the meter has means 13 for creating a swirling stream of liquid and means 14 for confining particles present in the liquid.

19 Claims, 2 Drawing Sheets

VOLUMETRIC LIQUID METER

The invention relates to reciprocating-piston type meters for measuring liquid volume. Such meters comprise a meter body having a measurement chamber disposed therein.

Reciprocating-piston meters for measuring liquid volume are well known to the person skilled in the art. Use thereof as flow meters is described, for example, in French patent application No. FR 00/09276. A major application for this type of meter lies in the field of residential metering for measuring the quantity of water consumed.

It happens quite often that the water distribution network is the subject of works which cause particles to become introduced accidentally into the network, for example grains of sand. On penetrating into a meter, these particles can cause it to jam or they can degrade its measuring performance.

It is known that this problem can be solved by greatly reducing the speed of the liquid penetrating into the meter, e.g. by increasing the flow section of the liquid so as to cause particles to precipitate towards the bottom of the vessel.

It is also known to provide one or more filters upstream from the measuring chamber proper, and to modify filter parameters, e.g. concerning the size and the shape of its mesh.

Nevertheless, know methods or devices are ineffective in the long term, and in particular filters can become clogged and/or can give rise to significant head losses.

An object of the invention is to improve filtering by proposing a meter for measuring liquid volume, which meter is provided with a localized settling device. The reciprocating-piston type meter for measuring liquid volume comprises:

a meter body having a measuring chamber disposed therein; and
   means for creating a swirling stream of liquid and means for confining particles present in the liquid, said means being provided in a space existing between the meter body and the measuring chamber.

Advantageously, the means for creating a swirling stream of liquid comprise a wall suitable for directing the particles present in the liquid from an inlet opening of the meter body towards the confinement means.

In a particularly advantageous embodiment, the means for confining the particles present in the liquid are constituted by at least one wall end forming at least one particle trapping zone.

The invention presents the advantage of enabling the filtering function to be improved by causing particles to settle out locally prior to penetrating into the measuring chamber, while avoiding obstructing the main filter.

Other characteristics and advantages of the invention appear in the following detailed and non-limiting description of various embodiments given with reference to the accompanying drawings, in which.

Figure 1:
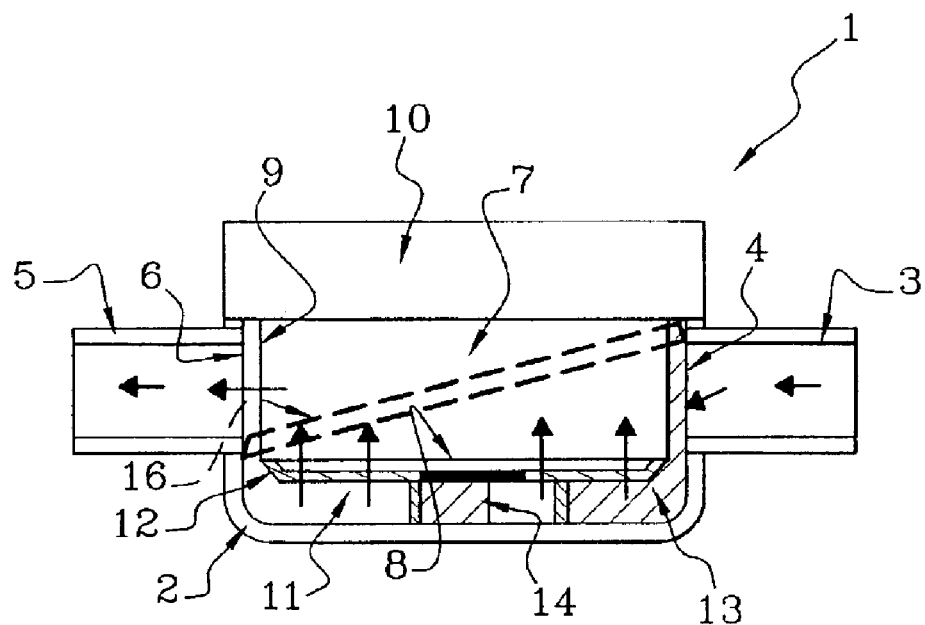
FIG. 1 is a side view in section on AA of a reciprocating-piston meter for measuring liquid volume and provided with a settling device in a first embodiment of the invention.

In general, the arrows in all of the figures show the flow directions of the liquid.

The reciprocating-piston type meter 1 for measuring liquid volume has a liquid inlet tube 3 and a liquid outlet tube 5. The tubes open out into the meter body 2 via a liquid inlet opening 4 and outlet opening 6, respectively.

A measuring chamber 7 is disposed inside the meter body 2. The measuring chamber 7 has a liquid inlet port 8 and a liquid outlet port 9 together with a piston (not shown). The inlet port is in the bottom portion of the measuring chamber, while the outlet port is in the top portion of the measuring chamber. The piston is situated inside the chamber. In general, a main filter 12 is disposed upstream from the inlet port 8.

In accordance with the invention, means are provided for creating a swirling stream of liquid and for confining any particles present in the liquid, said means being located between the inlet opening and the inlet port of the measuring chamber in a space 11 that extend between the meter body 2 and the measuring chamber 7.

The means for creating a swirling stream of liquid comprise at least one wall 13; 16, 17; 20, 21 disposed in the space that extends between the meter body and the measuring chamber, the wall being of a shape that is suitable for directing the liquid together with any particles that are present in the liquid away from the inlet opening and towards the confinement means.

The confinement means for confining particles present in the liquid may be constituted:

by the wall 16, 17 constituting the means for creating a swirling stream of liquid; or
   by a wall end 14; 18, 19; 22 of special shape; said particle confinement means defining a particle trapping zone 15; 15a, 15b (the trapping zone is represented diagrammatically in FIGS. 2 to 5 by one or more dashed-line circles combined with arrows representing a liquid swirl).

Advantageously, the wall 13; 16, 17; 20, 21 of the means for creating a swirling stream of liquid is of a shape designed to stabilize or to increase the speed of the liquid penetrating into the meter body so as to bring any particles in suspension towards the trapping zone.

The liquid enters via the inlet tube 3 and flows through the inlet opening 4 into the space 11 that extends between the meter body 2 and the measuring chamber 7. A gasket 16 (represented by dashed lines in FIG. 1) surrounds the measuring chamber and prevents liquid from flowing directly from the inlet opening to the outlet opening.

The liquid penetrates into the bottom portion of the measuring chamber via the admission port 8 and through the main filter 12 all along the path which it is constrained to follow between the inlet opening and the trapping zone 15 (the upward direction of the vertical arrows in FIG. 1 indicate the direction in which the liquid penetrates into the chamber). A large fraction of the particles in suspension in the liquid are transported in the stream of liquid to the trapping zone(s) 15; 15a, 15b. Particles reaching this zone are stored therein throughout the lifetime of the meter.

Only particles that are small in size and/or light in weight penetrate directly with the liquid into the measuring chamber or are stopped by the main filter 12. The liquid leaves the measuring chamber via its top portion and is delivered via the opening 6 and the outlet tube 5.

The volume-measuring meter having such a measuring chamber operates on the principle of admitting a given volume of liquid through the admission port into the piston, and by communicating its energy to the piston, the liquid causes the piston to rotate, thereby enabling the liquid to be delivered to the outlet port. Thus, each revolution of the piston corresponds to a given volume of liquid passing through the meter. Each revolution is counted by a counter 10 which serves to display the quantity of liquid that has passed through the meter, and/or to transmit said quantity to remote meter-reading means.

The trapping zone 15; 15a, 15b is a zone that is isolated from the filter portion proper, thus enabling particles to be stored in a zone of the meter that is situated upstream from the measuring chamber and the main filter.

Advantageously, in all of the embodiments of the invention described below, at least a portion of the main filter and/or the bottom portion of the measuring chamber lying above the trapping zone 15; 15a, 15b is obstructed in such a manner as to prevent any liquid or particles being sucked in from the trapping zones to the measuring chamber. Consequently, the particles do not obstruct the main filter and/or cannot penetrate into the measuring chamber, thus ensuring that they do not disturb the operation of the meter in measuring flow rate.

The device of the invention is effective over the entire operating range of flow rates of the flow meter.

When the flow rate is low, the liquid is stable and the particles rest on the bottom of the vessel in the trapping zone. When the flow rate is high, the liquid swirls and the particles are confined in the trapping zone.

The means for creating a swirling stream of liquid and the confinement means may be connected to the meter body itself. Alternatively they can be connected to the measuring chamber 7 or to the main filter 12.

The wall(s) and the wall ends, if any, are then either provided directly during manufacture of these various elements, e.g. by molding, or else they are added subsequently to the various elements mentioned above by heat sealing or by adhesive.

Figure 2:
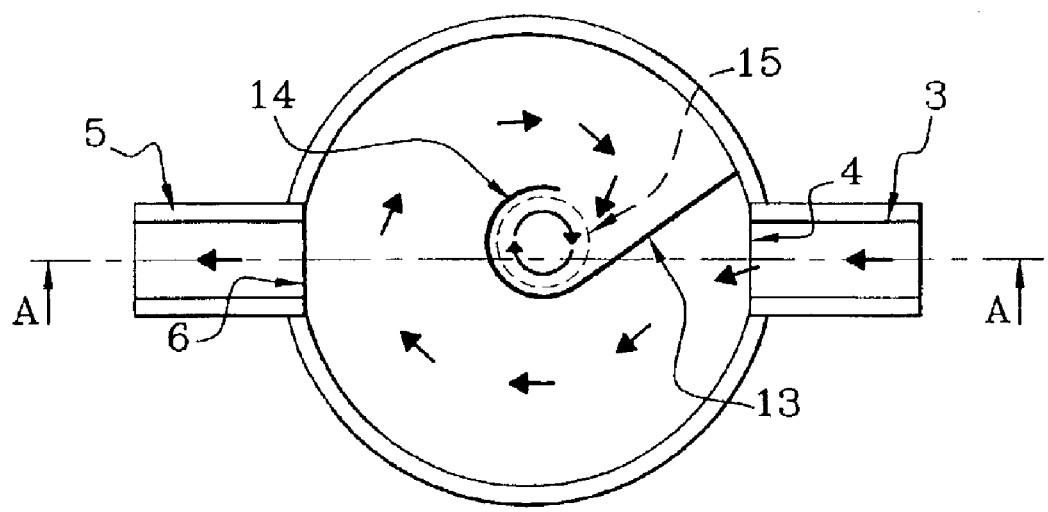
FIG. 2 is a plan view in section of the reciprocating-piston meter for measuring liquid volume and provided with a settling device in the first embodiment of the invention as shown in FIG. 1.

In a first embodiment as shown in FIG. 2, the means for creating a swirling stream of liquid and the particle confinement means are constituted by a substantially rectilinear wall portion 13 and by a wall end 14 presenting a portion in the form of a circular arc or a portion in the form of a spiral.

As a variant of this first embodiment, the means for creating a swirling flow of liquid and the particle confinement means may be constituted by a single wall 13, 14 presenting a portion in the form of a circle or in the form of a spiral.

Advantageously, the wall and/or wall end are positioned in the space 11 in such a manner that the trapping zone 15 is situated substantially at the center of the circle defining the bottom of the meter body.

The wall imposes swirling motion on the stream of liquid entering the inlet tube, which stream is guided towards the trapping zone where any particles present in the liquid accumulate.

Figure 3:
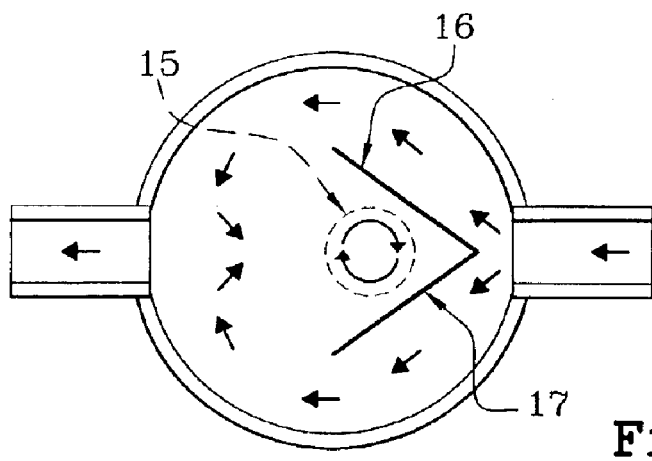
FIG. 3 is a plan view in section of a reciprocating-piston meter for measuring liquid volume and provided with a settling device in a second embodiment of the invention.
Figure 4:
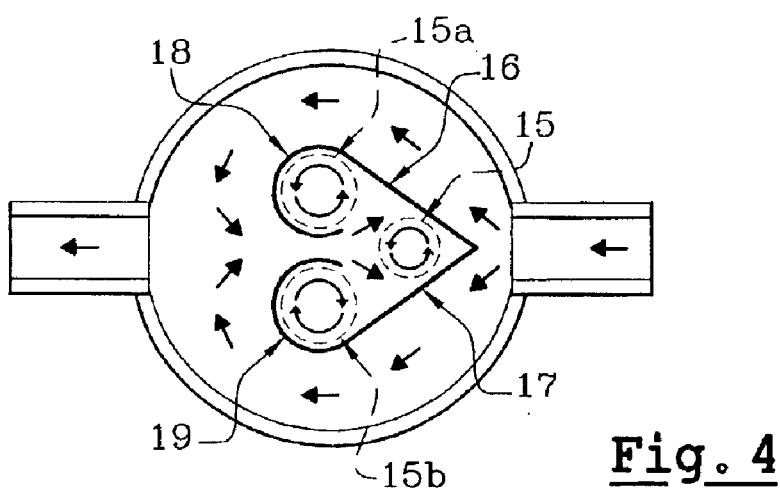
FIG. 4 is a plan view in section of a reciprocating-piston meter for measuring liquid volume and provided with a settling device constituting a variant of the second embodiment of the invention.

In a second embodiment shown in FIGS. 3 and 4, the means for creating a swirling stream of liquid and the means for confining particles comprise two walls 16 and 17 having their ends connected together to form a V-shape. This shape serves to define a particle trapping zone 15 near the end of the V-shape, between the two walls 16 and 17.

In a variant of this second embodiment (see in particular FIG. 4), at least one of the two walls 16 and 17 is extended by a wall end 18, 19 presenting a portion in the form of a spiral or in the form of a circular arc turning towards the inside of the V-shape. This variant embodiment provides three distinct trapping zones: two zones 15a and 15b disposed substantially symmetrically about the axis of the inlet and outlet tubes and defined by the wall ends 18 and 19; and a zone 15 close to the end of the V-shape between the two walls 16 and 17.

The walls split the stream of liquid arriving from the inlet tube into two streams, and impart opposite swirling motion towards the trapping zone(s).

Figure 5:
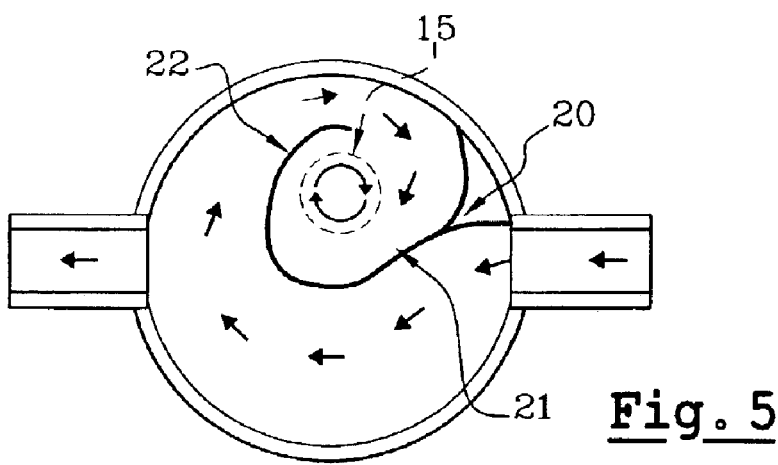
FIG. 5 is a plan view in section of a reciprocating-piston meter for measuring liquid volume and provided with a settling device in a third embodiment of the invention.

In a third embodiment shown in FIG. 5, the means for creating a swirling stream of liquid and the means for confining the particles comprise:

a deflector 20 having two limbs fixed to the meter body close to the inlet opening 4;

a rectilinear first wall portion 21 having one end fixed to the deflector 20; and a curved second wall portion 22 fixed to the other end of the substantially rectilinear first wall portion.

The space that extends between the first and second wall portions forms the particle trapping zone 15.

The deflector 20 has two limbs serving to guide the stream of liquid from the inlet opening to the trapping zone while presenting it with a wall profile that is continuous all along its path, thus avoiding the creation of any turbulent phenomena either when the liquid penetrates into the space 11 or at the end of its travel in the vicinity of the trapping zone 15.

In an additional variant of the various embodiments described above, the particle trapping zone 15; 15a, 15b has a secondary filter (not shown). This filter can occupy all or part of the particle trapping zone(s).

By way of example, the filter can be made of a material comprising synthetic or metal fibers. The fibers of the material can be distributed in such a manner as to form a strainer. Advantageously, the mesh size of the strainer is much smaller than that of the main filter.

Furthermore, the filter may present mesh size that varies between the inlet opening and the confinement zone, with the mesh size decreasing progressively all along said path. This makes it possible, amongst other things, to reduce head loss through the meter.

The fibers of the material may be interlaced and distributed through a volume.

What is claimed is:

1. A reciprocating-piston type meter for measuring liquid volume, the meter comprising a body (2) in which a measuring chamber is disposed, said meter including means for creating a swirling stream of liquid and means for confining particles present in the liquid, said means being provided in a space (11) existing between the meter body (2) and the measuring chamber, and wherein said swirling stream of liquid centrifuges particles in order to move them toward the means for confining particles.

2. A meter according to claim 1, in which the means for creating a swirling stream of liquid comprise a wall (13) suitable for directing the particles present in the liquid from an inlet opening (4) of the meter body (2) towards the confinement means (14; 15; 15a, 15b, 15c).

3. A meter according to claim 1, in which the means for confining the particles present in the liquid are constituted by at least one wall end (14) forming at least one particle trapping zone (15; 15a, 15b, 15c).

4. A meter according to claim 1, in which the means for creating a swirling stream of liquid and the means for confining particles are constituted by a common wall (13, 14) presenting a portion in the form of a spiral.

5. A meter according to claim 1, in which the means for creating a swirling stream of liquid and the means for confining particles are constituted by a common wall (13, 14) presenting a portion in the form of a circular arc.

6. A meter according to claim 1, in which a main filter (12) is provided between the inlet port (8) to the measuring chamber and the means for creating a swirling stream of liquid together with the means for confining particles (13, 14).

7. A meter according to claim 1, in which the confinement means include a secondary filter occupying at least a portion of the particle trapping zone (15; 15a, 15b).

8. A meter according to claim 1, in which the means for creating a swirling stream of liquid and the confinement means (13, 14) are connected to the meter body (2).

9. A meter according to claim 1, in which the means for creating a swirling stream of liquid and the confinement means (13, 14) are connected to the measuring chamber (7).

10. A meter according to claim 1, in which the means for creating a swirling stream of liquid and the confinement means (13, 14) are connected to the first filter (12).

11. A meter according to claim 1, in which the meter is a full flow meter.

12. A meter according to claim 1, wherein the swirling stream of liquid in the forms a whirl in th region of particle confinement.

13. A reciprocating-piston type meter for measuring liquid volume, the meter comprising a body (2) in which a measuring chamber is disposed, said meter including means for creating a swirling stream of liquid and means for confining particles present in the liquid, said means being provided in a space (11) existing between the meter body (2) and the measuring chamber, the means for creating a swirling stream of liquid comprise a wall (13) suitable for directing the particles present in the liquid from an inlet opening (4) of the meter body (2) towards the confinement means (14; 15; 15a, 15b, 15c) in which a wall portion (13) is substantially rectilinear and the wall end (14) presents a portion in the form of a spiral.

14. A reciprocating-piston type meter for measuring liquid volume, the meter comprising a body (2) in which a measuring chamber is disposed, said meter including means for creating a swirling stream of liquid and means for confining particles present in the liquid, said means being provided in a space (11) existing between the meter body (2) and the measuring chamber, the means for creating a swirling stream of liquid comprise a wall (13) suitable for directing the particles present in the liquid from an inlet opening (4) of the meter body (2) towards the confinement means (14; 15; 15a, 15b, 15c), in which a wall portion (13) is substantially rectilinear and the wall end (14) presents a portion in the form of a circular arc.

15. A reciprocating-piston type meter for measuring liquid volume, the meter comprising a body (2) in which a measuring chamber is disposed, said meter including means for creating a swirling stream of liquid and means for confining particles present in the liquid, said means being provided in a space (11) existing between the meter body (2) and the measuring chamber, the means for creating a swirling stream of liquid and the means for confining particles comprise a two-limb deflector (20) fixed to one end of a substantially rectilinear first wall portion (21), a curved second wall portion (22) being fixed to the other end of the substantially rectilinear first wall portion so as to define a particle trapping zone (15) in the space that extend between the first and second wall portions.

16. A reciprocating-piston type meter for measuring liquid volume, the meter comprising a body (2) in which a measuring chamber is disposed, said meter including means for creating a swirling stream of liquid and means for confining particles present in the liquid, said means being provided in a space (11) existing between the meter body (2) and the measuring chamber, the means for creating a swirling stream of liquid and the means for confining particles comprise two walls (16, 17) having their ends connected together so as to form a V-shape and defining a particle trapping zone (15) in the vicinity of the end of the V-shape.

17. A meter according to claim 16, in which a wall end (18, 19) presenting a portion in the form of a spiral turned towards the inside of the V-shape extended at least one of the two walls (16, 17) in such a manner as to define at least one additional trapping zone (15a, 15b).

18. A meter according to claim 16, in which a wall end (18, 19) presenting a portion in the form of a circular arc turned towards the inside of the V-shape extended at least one of the two walls (16, 17) in such a manner as to define at least one additional trapping zone (15a, 15b).

19. A reciprocating-piston type meter for measuring liquid volume, the meter comprising a body (2) in which a measuring chamber is disposed, said meter including means for creating a swirling stream of liquid and means for confining particles present in the liquid, said means being provided in a space (11) existing between the meter body (2) and the measuring chamber, in which a main filter (12) is provided between the inlet port (8) to the measuring chamber and the means for creating a swirling stream of liquid together with the means for confining particles (13, 14,) a portion of the main filter overlying at least one trapping zone (15; 15a, 15b) is obstructed in such a manner as to prevent any liquid and particles from being sucked from the space (11) towards the measuring chamber.

* * * * *